United States Patent [19]

Iwashita et al.

[11] 4,175,845
[45] Nov. 27, 1979

[54] WINDING UP DEVICE OF A CAMERA

[75] Inventors: Tomonori Iwashita, Fuchu; Hiroyuki Takimoto, Urawa; Yukio Mashimo, Tokyo; Teiji Hashimoto, Kawasaki, all of Japan

[73] Assignee: Canon Kabushiki Kaisha, Tokyo, Japan

[21] Appl. No.: 834,505

[22] Filed: Sep. 19, 1977

[30] Foreign Application Priority Data

Sep. 22, 1976 [JP] Japan .................. 51-114188

[51] Int. Cl.² .................. G03B 1/18; G03B 17/42; F16D 11/06
[52] U.S. Cl. .................. 354/173; 354/206; 354/213; 192/26
[58] Field of Search .................. 354/23 D, 43, 60 R, 354/171, 173, 205, 206, 213, 271, 212, 204; 352/124, 180; 242/71.4, 71.5, 75.43, 75.44; 192/26

[56] References Cited

U.S. PATENT DOCUMENTS

Re. 29,505   12/1977   Aizawa et al. .................. 354/173 X
3,021,512    2/1962    Welsh et al. .................. 192/26
4,015,198    3/1977    Iwashita et al. .................. 354/173 X
4,052,126    10/1977   Freudenschuss .................. 352/180 X Primary Examiner—L. T. Hix
Assistant Examiner—William B. Perkey
Attorney, Agent, or Firm—Toren, McGeady and Stanger

[57] ABSTRACT

In a winding up device of a camera settable to an operative position at a phase of exposure completion and to an inoperative position at a phase of winding up completion, there is provided an electromagnetic clutch in transmitting means for transmitting driving force from a drive source of the winding up device. Electrical supply of power to the drive source or winding up motor and the electromagnetic clutch are controlled through a detecting means for detecting the phase of winding up completion to effect rapid changeover between the connection and separation of the driving force of the winding up motor to and from a winding member of the camera, thereby a continuous winding up operation is performed with ease. Power is cut off to the winding up motor switching device and to an electromagnetic clutch switching means to make the film winding up mechanism powerless before a device for stopping the wind up action begins to work.

12 Claims, 7 Drawing Figures

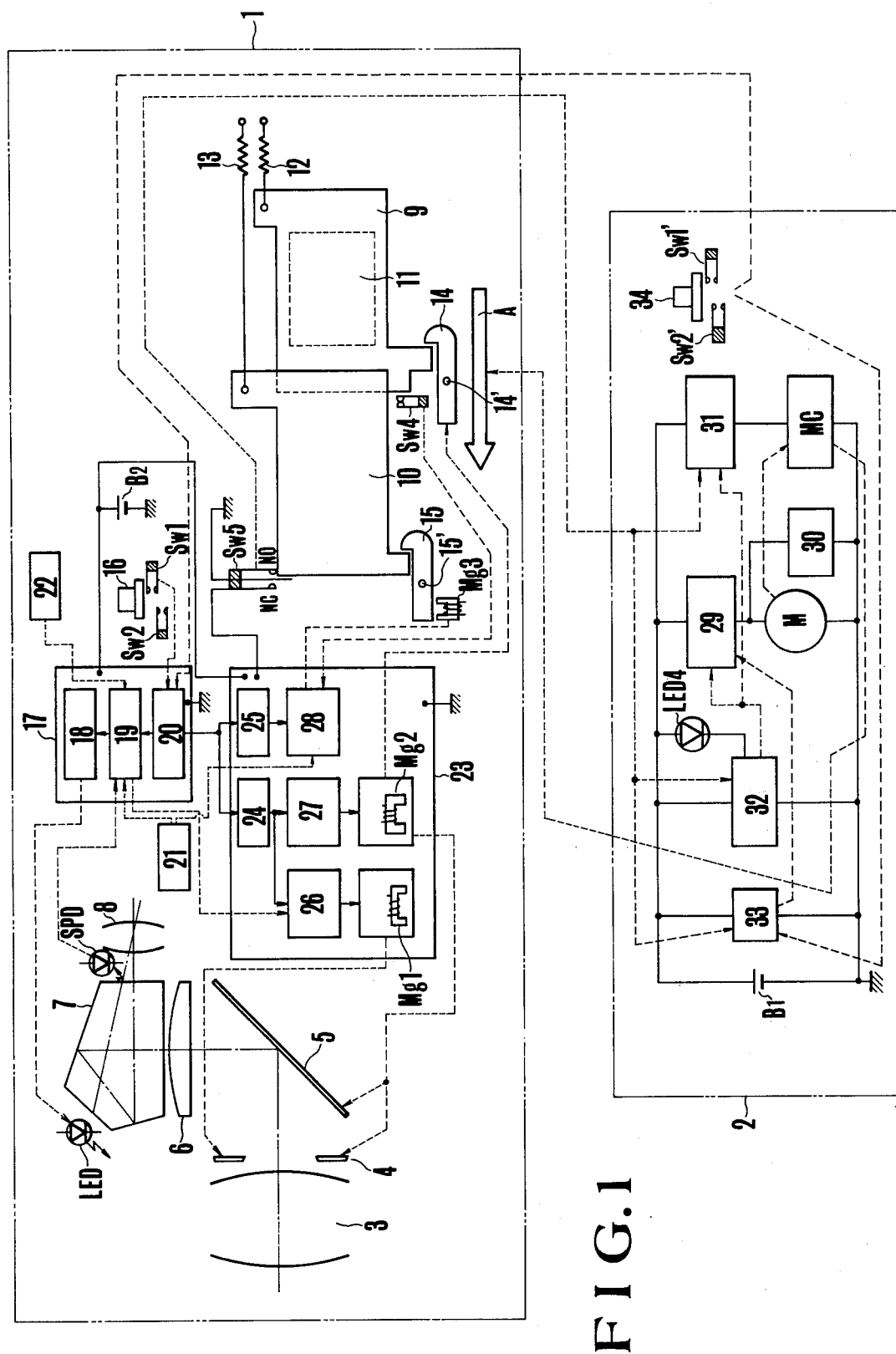
F I G.1

WINDING UP DEVICE OF A CAMERA

BACKGROUND OF THE INVENTION

1. Field of the Invention

This invention relates to a motor drive unit for performing film winding, shutter charging, release actuating and the like operation of a camera by motor drive, and more particularly to a winding up device for a camera suited for automatic winding up for the purpose of making a continuous series of frame exposures.

2. Description of the Prior Art

In general, a winding up device always used in a camera performs winding up operation while driving a shutter mechanism, film winding mechanism and the like with the help of the torque of an electric motor. Upon detection of completion of the winding operation, the torque of the motor is cut off. After the removal of stress caused by the winding torque, which is also detected, the shutter is released. Then, upon detection of the occurrence of the shutter being closed, the next following winding up operation is performed. In order to make a continuous series of frame exposures, therefore, it is of importance to remove the unwanted torque which remains in excess after the completion of the preceding winding operation, or otherwise the frame frequency must be decreased to assure smooth camera operation.

With a camera operating with a motor drive unit removably attached thereto, after a film winding and shutter cocking operation has been completed, an excessive load resulting from the large inertia of the motor and the movable parts related to the motor and also from the slow time response of signal detecting means such as that for detecting the point in time at which the winding operation is completed, remains applied on the various portions of the camera. This excessive load, when concentrated at the latching means of the shutter mechanism, will lead to a loss in accuracy of exposure control because of the lack of smooth sequence of events and in some cases to the impossibility of actuating a shutter release.

Attempts have been made to remove such unwanted torque exerted on the winding shaft of the camera either by providing a slippage clutch as arranged in the path of transmission of a driving torque from the motor to the winding shaft, or by detecting an accidental increase in the current flowing through the coil of the motor which will be encountered when an excess load is applied to the motor to cut off the electrical power supply to the motor. These conventional methods are characterized in that an excess load is permitted to enter the camera. Because of the slow response of the detecting means, it is very difficult to reduce the load to zero. In the case of the former method, the provision of the slippage clutch in the torque transmission will lead to an increase in the complexity of the winding up device which does not contribute to the minimization of the size of the device and also to the application of an excess electrical load on the motor at the initiation of operation of the slippage clutch. In the case of the latter method, it is required to detect a slight deviation of the intensity of current flowing through the coil of the motor from a specified value at which the motor operates with no load. However, the adjustment of the device to this specific value is difficult to perform. Further, during the winding operation, when an excess load resulting from other than the completion of the winding operation is applied, operation of the winding up device is stopped. Therefore, the number of different operating modes available in the conventional motor driven camera is limited to a small value.

Another disadvantage of the conventional automatic winding up device is that in order to remove the unwanted driving torque, the completion of the winding operation is followed by the initiation of a shutter release after a time interval large enough to prevent the frame frequency from being increased.

An object of the present invention is to provide a winding up device for a camera which has overcome the above-mentioned conventional drawbacks. Instead of detecting the excess load which remains after the completion of winding operation, use is made of means for detecting the point in time at which the winding operation is completed in combination with an electromagnetically activated clutch as arranged in the driving torque transmission so that a large residual driving torque is prevented from entering the camera.

Another object of the present invention is to achieve minimization of the residual driving torque which is effected during the time when the light value for automatic exposure control is stored. According to the invention, therefore, there is no need to provide any time interval particularly designated for removing the residual driving torque.

BRIEF DESCRIPTION OF THE DRAWINGS

FIG. 1 is a schematic diagram, partly in block form, of a motor driven camera and its coordinating and control system embodying the principles of the invention.

DESCRIPTION OF THE PREFERRED EMBODIMENT

Figure 2:
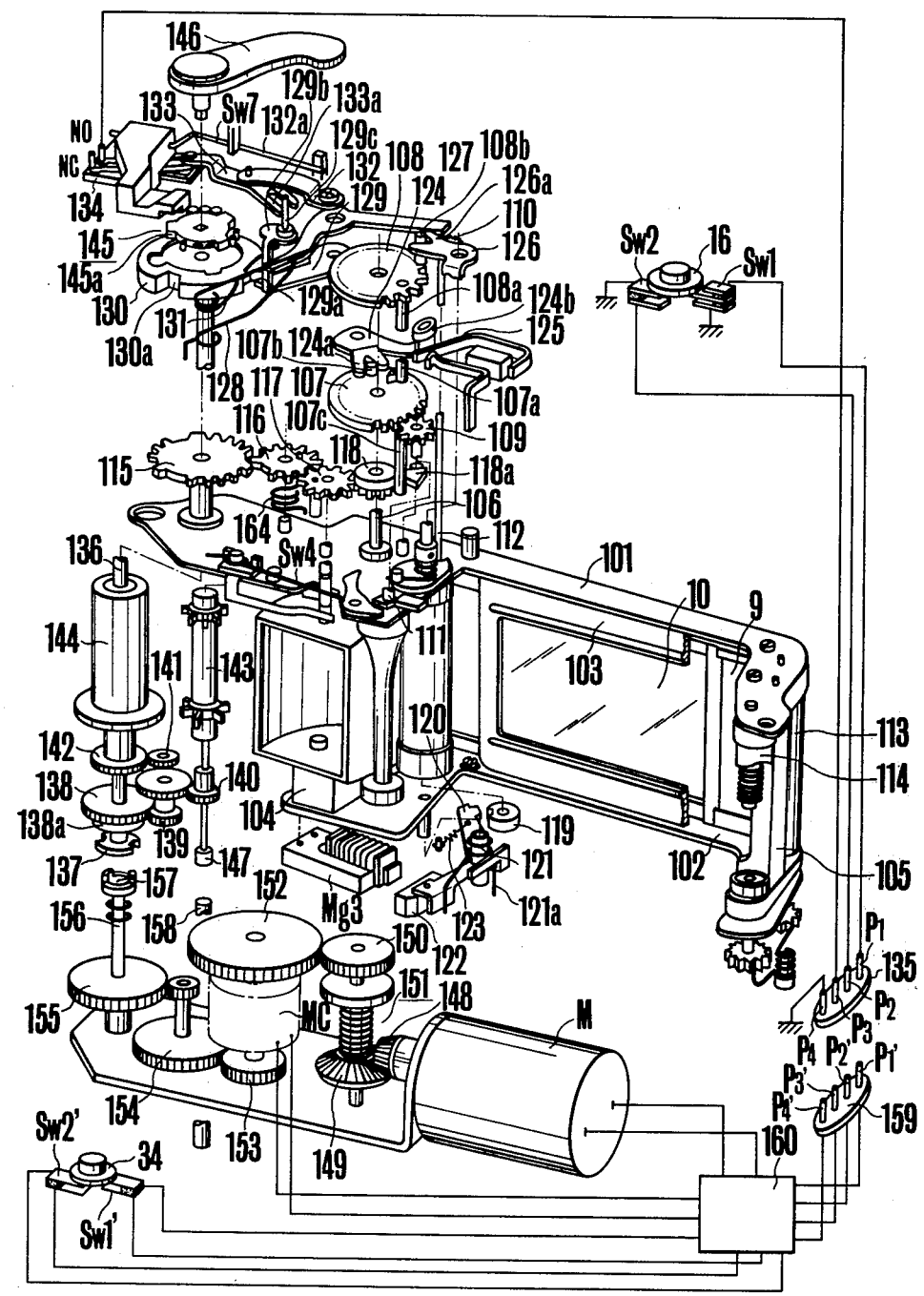
FIG. 2 is an exploded perspective view of the basic mechanical parts of a camera with a motor drive unit therefor employing the present winding up device.

One preferred embodiment of the present invention will next be explained in detail by reference to the drawings. Referring first to FIG. 1, there are shown two main blocks 1 and 2 for a single lens reflex camera and a motor drive unit respectively. The camera 1 includes an objective lens 3, a diaphragm 4, a tiltable mirror 5 shown in a viewing position, a condenser lens 6, a pentaprism 7 and an eye-piece 8, these parts constituting a viewfinder optical system. SPD is a light sensitive element arranged adjacent the exit face of the prism 7 to receive light coming from an object to be photographed through the objective lens 3. In order to display whether the light value as sensed by SPD falls within a dynamic range of exposure control, whether the effective operating mode is of automatic exposure control, what values of the shutter speed and diaphragm aperture are set, and the like, there is provided an indicator LED such as of light emitting diodes positioned to be visible near or in the field of view of the finder.

A focal plane shutter of the camera comprises front and rear shutter curtains 9 and 10 biased by respective tension springs 12 and 13 upon disengagement from respective latching levers 14 and 15 to run down in front of an exposure aperture 11. At the start of running down of the front curtain 9, a switch SW4 is actuated to start operation of a shutter time control circuit 28. At the termination of a time interval as manually preset in a shutter speed information source 21 by a (not shown) shutter dial, the shutter time control circuit 28 actuates a third electromagnet Mg3 causing the rear curtain 10 to run down with simultaneous occurrence of setting of a switch SW5 to "NO" position by the action of the rear curtain 10. This latter switch SW5 may, therefore, be considered as to serve as a switch for detecting an exposure completion signal, or shutter closing signal. When a shutter cocking and film winding up operation has been completed, SW5 is set to "NC" position.

First and second release actuating switches SW1 and SW2 are arranged to be closed when a release button 16 is depressed to a first stroke and therefrom to a second stroke respectively. When the first switch SW1 is closed, a display control and a light measuring circuit 17 and 18 are supplied with electrical power from a battery B2. A power supply to a block 23 is effected only when the closure of the second switch SW2 and the setting of SW5 in "NC" position simultaneously occur.

Block 23 includes two self-retaining circuits 24 and 25 as switch means, an exposure control circuit 26 responsive to the output of the light measuring circuit 19 for controlling initiation of actuation of a first electromagnet Mg1 associated with an automatic exposure determining means, in this instance, diaphragm control means, a release mechanism-driving circuit 27 responsive to the switches SW1 and SW2 for energizing and de-energizing a second electromagnet Mg2 associated with a mechanism for actuating a release of the diaphragm blade closing down member, a mirror upward movement control member, and the first latching lever 14, and aforesaid shutter time control circuit 28. It is to be noted that the light measuring circuit 19 and the display control circuit 18 can be rendered operative by the depression of the release button 16 at any phase of one cycle of shutter releasing and cocking operation, but the exposure control circuit 26, the release mechanism driving circuit 27 and the shutter time control circuit 28 are rendered operative in the only time interval during which the switch SW5 remains in "NC" position, or between a moment when the winding up of the film through the length of one frame has been completed and a moment when the rear curtain 10 runs down. The first electromagnet Mg1 functions to preset the diaphragm 4 in a diaphragm value determined by the exposure control circuit 26.

The motor drive unit 2 includes an electric motor M of which motion is transmitted to both of shutter cocking and film winding up mechanisms, an electromagnetically activated clutch MC arranged in the path of transmission of the motion from the motor M to a winding shaft later to be described, a motor drive control or switching circuit 29 responsive to either of the outputs of a delay circuit 32 and a selected winding up mode responsive circuit 33 for controlling the period of energization of the motor M from a battery B1, a braking circuit 30 connected across the winding of the motor M, a second switching circuit 31 responsive to either of the outputs of the delay circuit 32 and the switch SW5 for controlling actuation of the electromagnet for the clutch MC as supplied with electrical power from the battery B1, and a light-emitting diode LED4 as a display element connected to the output of the delay circuit 32 upon energization to indicate that the last frame available in the used film has just been exposed so that the film can not be advanced further. When one cycle of film winding up operation has not been completed in a predetermined time interval, therefore, the delay circuit 32 stops the power supplies to the motor M and clutch MC. The circuit 33 operates for selective drive control of the motor M through the switching circuit 29 in either of NORMAL and SINGLE FRAME modes for taking a continuous series of picture frames at a higher or lower frequency, or a single frame picture for each actuation of the release button 16. Instead of using the button 16 arranged on the camera housing, it is possible to use a button 34 arranged on the unit housing not shown. Two switches SW1' and SW2' actuable by the common button 34 perform the respective same functions as those of SWs 1 and 2.

The operation of the system of FIG. 1 is as follows: The camera 1 and the drive unit 2 are assumed to be in the shutter cocked position where the switch SW5 is in "NC" position. The operator will first manipulate a shutter dial and a film speed dial to select a desired shutter speed and the sensitivity of the used film for entry into the shutter speed information source 21 and the film speed information source 22. Upon depression of the release button 16 or 34 to the first stroke, the first actuating switch SW1 or SW1' is closed to start operation of block 17. Responsive to the outputs of SPD, and information sources 21 and 22, the light measuring circuit 19 produces an output representative of an exposure value, in this instance, a proper diaphragm aperture value which is delayed by the display circuit 17 in the field of the viewfinder. Upon further depression of the button 16 or 34 to the second stroke, the second actuating switch SW2 or SW2' is closed to start operation of block 23. By the provision of the self-retaining circuits 24 and 25, it is insured that even when the operator removes his finger from the button before the first frame exposure is completed, all the circuits in block 23 are maintained operative until the completion of the particular frame exposure. As the exposure control circuit 26 starts to operate, the proper diaphragm aperture value determined by the light measuring circuit 19 is memorized for a short time because of the simultaneous actuation of the release mechanism. Just after a diaphragm scanning operation has been arrested by the first electromagnet Mg1 to adjust the presetting of the diaphragm 4 to the proper diaphragm aperture value, the diaphragm closing down member is operated to decrease the actual size of diaphragm aperture from the full open to the presetting. At the same time, the mirror 5 is moved from the viewing to the non-viewing position, and the front curtain latching lever 14 is turned about its pivot pin 14' in a clockwise direction as viewed in FIG. 1, thereby the front curtain 9 is driven to run down under the action of spring 12 in an opposite direction to that indicated by arrow A, permitting initiation of an exposure of the film through the frame aperture opening 11. At the start of movement of the front curtain 9, the fourth switch SW4 is opened to start shutter time counting operation of the circuit 28. As the desired shutter speed was previously set in the information source 21 and therefrom entered into the shutter speed control circuit 28, when the duration of the desired shutter time has been terminated, the third electromagnet Mg3 is de-energized, causing clockwise movement of the rear curtain latching lever 15 about its pivot pin 15' which in turn causes the rear curtain 10 to run down under the action of the spring 13 in an opposite direction to that indicated by arrow A, thereby the exposure is terminated. When the rear curtain 10 nears a terminal end of running down movement, the fifth switch SW5 is switched from "NC" to "NO" position by a (not shown) braking means for the rear curtain 10 so that block 23 is rendered inoperative or cut off from the battery B2, and, at the same time, the second switching circuit 31 is actuated to energize the electromagnet for the clutch MC.

Now assuming that the motor drive unit 2 was set in a position for NORMAL mode which operates at the higher frame frequency, then the motor M was supplied with electrical power from the battery B2 by the winding control circuit 33 through the first switching circuit 29 as the closure of the second actuating switch SW2 or SW2' actuated the winding control circuit 33. When the rear curtain 10 arrives at a position where the exposure aperture 11 is fully closed and where SW5 is in "NO" position, therefore, the second switching circuit 31 is actuated to obtain clutch action, thereby motion of the motor is initiated to be transmitted to the winding shaft of the camera 1 with simultaneous occurrence of advancement of the film through the length of one frame, and of shutter cocking operation of the front and rear curtains 9 and 10 to their illustrated positions, where SW5 is again set to "NC" position. At the termination of the shutter cocking and film winding operation, the power supply to the electromagnetic clutch MC is cut off by the switching circuit 31, while still permitting the power supply to the motor M to be continued. The setting of SW5 to "NC" position also causes the circuits in block 23 to be rendered operative again for the start of a next exposure. Alternately assuming that the motor drive unit 2 was set for NORMAL mode with the lower frame frequency, then the motor M is energized together with the electromagnetic clutch MC when SW5 is switched to "NO" position.

Alternately assuming that the motor drive unit 2 was set for SINGLE FRAME operation mode, then the winding control circuit 33 controls operation of the switching circuit 29 for the motor M in such a manner that when any of SWs 2 and 2' is opened, or when any of the release buttons 16 and 34 is released from the force exerted to depress it to the second stroke, the switching circuit 29 connects the motor M to the battery B1. In consequence, when the setting of SW5 to "NO" position and the release of the once actuated button have simultaneously occurred, the electrical power supplies to the motor M and electromagnetic clutch MC are established by the first and second switching circuits 29 and 31 respectively along with the start of operation of the delay circuit 32. This delay circuit 32 is designed to provide a time interval somewhat longer than that necessary to complete one normal performance of shutter cocking and film winding up operation. As the latter varies from 150 to 300 milliseconds depending upon the actual voltage of the battery B1, the delay time interval must be adjusted to 350 milliseconds, or thereabout. The both switching circuits 29 and 31, when ON, start to drive the motor M for rotation and the electromagnetic clutch MC for positive action so that motion of the motor is transmitted through the clutch MC to the winding shaft of the camera. When one normal performance of shutter cocking and film winding operation has been completed, the switch SW5 is turned from "NO" to "NC" position at which the both switching circuits 29 and 31 are turned off to terminate the duration of energization of the motor M and the clutch MC. By the braking circuit, rotation of the motor M gets rapidly stopped.

If a reversing force is exerted on the winding shaft at a time during the winding operation due to, for example, lack of availability of any more frames in the film, the particular winding operation will be lengthened beyond the specific delay time of the delay circuit 32. In this case, the both switching circuits 29 and 31 are actuated by the output of the delay circuit 32 at the termination of duration of the delay time to cut off the electrical power supplies to the motor M and the clutch MC.

Referring now to FIGS. 2 to 6, there is shown a specific example of a motor driven camera operating with the system of FIG. 1. In FIG. 2, there are shown the basic mechanisms of the camera 1 and motor drive unit 2 removably attached to the camera 1, with the camera 1 including shutter actuating, shutter driving, shutter braking, shutter charging and film winding mechanisms each of which to be described in detail below.

The focal plane shutter having the front and rear curtains 9 and 10 of FIG. 1 is supported between upper and lower panels 101 and 102 which are secured in accurately spaced relation to each other by rods 104 and 105 and which are made of aluminum die cast, or plastic. The rod 104 is formed to provide a battery chamber therein, which can accommodate a battery B2 of FIG. 1. Mounted across the upper and lower panels 101 and 102 is an aperture plate 103 having a rectangular opening with its center in the area being aligned with the optical axis of the objective lens 3 of FIG. 1, and with its open area defining the format of the film. This plate 103 also serves to increase the rigidity of the framework structure constituted from the upper and lower panels 101 and 102, and the rods 104 and 105. The upper and lower panels 101 and 102 are cut out in a forward central portions to provide a space which a mirror box is intended to occupy.

The shutter driving mechanism includes a first winding drum 113 movably mounted between the upper and lower panels 101 and 102, on which the front shutter curtain 9 is wound when the shutter is released and in which the spring 12 of FIG. 1 is mounted, a pair of second winding drums 114 movably mounted between the upper and lower panels 101 and 102, on which respective ends of tapes are windable, the opposite ends of the tapes being connected to upper and lower sides of the border of the rear curtain 10, and in which the spring 13 of FIG. 1 is mounted, front and rear curtain master gears 107 and 108 rotatably mounted on a common shaft 106 upwardly extending from the front panel 101, and two pinions 109 and 110 meshing with the respective master gears 107 and 108 and fixedly mounted on respective shafts 111 and 112 extending over a space between the upper and lower panels 101 and 102, while the opposite ends of the front and rear curtains 9 and 10 to those windable on the first and second drums 113 and 114 are windable on these pinion shafts 111 and 112 respectively when the shutter is cocked.

The shutter charging mechanism includes a gear train including a driving gear 115 fixedly mounted on the winding shaft 136, intermediate two gears 116 and 117, and a driven gear 118 rotatable about the common shaft of the master gears 107 and 108 and having a triangular-shaped protrusion 118 radially extending therefrom into the path of movement of a pin 107c which extends laterally downwardly over the lower face of the master gear 107 at a point such that when the shutter is cocked, clockwise movement of the driven gear 118 is transmitted through the protrusion 118a-and-pin 107c connection to the front curtain master gear 107 and therefrom to the rear curtain master gear 108 through a pin 107a-and-pin 108 connection, until the shutter curtains are latched in the cocked position by latching means.

The latching means for the rear curtain 10 includes an adapter 119 fixedly mounted on the pinion shaft 112 and having a peripheral recess, and a two-armed lever 120 pivotal at a pin 121 and having a pawl formed at one arm end thereof for engagement with the recess, the opposite arm end of which movably carries an armature 122 arranged to cooperate with the electromagnet Mg3. The lever 120 is biased by a spring 123 to move the armature 122 away from the electromagnet Mg3 and, at the same time, to disengage the pawl from the recess of the adapter 119.

The shutter braking mechanism includes two sections for the front and rear curtains 9 and 10 respectively. 124 is a front curtain braking lever having two arms 124a and 124b, the former being arranged to be engaged with a pin 107b laterally upwardly extending from the upper face of the front curtain master gear 107 when the front curtain 9 nears the terminal end of running down movement, and then to permit further rotation of the master gear 107 but with simultaneous exertion of a braking action on the gear 107 as the pivot axis of the braking lever 124 is connected to a spring or the like (not shown). Positioned adjacent the other arm 124b is a movable contact member constituting part of an actuating switch 125 so called X-contact for a stroboscopic lamp (not shown) so that when the braking lever 124 is acted on, the switch 125 is closed.

A rear curtain braking means includes a lever 126 having an arm 126a arranged to be engaged with a pin 108b laterally upwardly extending from the face of the rear curtain master gear 108 when the rear curtain 10 nears the terminal end of running down movement. Upon further movement of the rear curtain 10, the braking lever 126 is turned in a clockwise direction, while simultaneously exerting a braking action on the gear 108 as the pivot axle of the lever 126 is connected to a (not shown) suitable resilient means such as a spring and leather known in the art.

Such clockwise movement of the braking lever 126 also causes counter-clockwise movement of an actuating lever 127 for actuating a release of the locking engagement between a lever 129 pivotal about the common axis of the lever 127 and a winding control cam disc 130 at a location where the lever pawl 129a slides in a recessed position 130a of the cam disc 130 and also for actuating the aforementioned switch SW5 of FIG. 1 designated by 134 in FIG. 2 to be switched between the "NC" and "NO" positions through an intermediary which includes a control lever 133 connected to body ground, pivotal about a pin 132 extending from a support member 132, and having a forked portion 133a formed at an opposite end thereof to that engaging the switch 134. Operatively connected in a recess of the forked portion 133a is a pin 129c extending from an upwardly bent-off portion 129b of the locking lever 129 so that when one performance of the winding up operation is completed with the lever pawl 129a dropped in the recess 130a, the control lever 133 is in the counter-clockwise turned position where SW5 is set in "NC" position. After the shutter is released, upon movement of the rear curtain 10 to a braked position by the lever 126, the actuating lever 127 is turned counter-clockwise along with the locking lever 129 because of a spring 128 connecting the lever 127 with the lever 129, thereby the winding control cam disc 130 is rendered movable relative to the locking lever pawl 129a, and the switch SW5 is set from "NC" to "NO" position. The switch SW5 is constructed in a printed circuit form with an electrically conductive path end NO being connected by way of a lead to a signal appearing terminal P3 in a connector 135 provided on the camera housing. Another terminal P4 is connected to body ground.

The film winding up mechanism includes the winding shaft 136 having a coupler 137 fixedly connected to the bottom end thereof, upon engagement with a driving coupler 157 of the motor drive unit 2, for rotating the shaft 136, the opposite end of which is fixedly connected to the winding control cam disc 130, a gear train 138 to 142, a sprocket 143 arranged upon pulling down of a plunger at a terminal knob 137 to be rotatable in unison with the gear 140, and a take-up spool 144 to which the gear 142 is drivingly connected through some suitable one-way clutch means (not shown). Fixedly connected to the gear 138 is a cam member 138 for resetting the automatic diaphragm control mechanism, the mirror driving mechanism, the diaphragm actuating mechanism and the like to their cocked positions. In order to manually operate the winding shaft 136, there is provided a oneway clutch 145 which includes a wheel 145a fixedly connected to a winding lever 146 and operating in a central space of the winding control cam 130 in such a manner that the driving torque of the winding lever 146 is transmitted to the winding shaft, but motion of the winding shaft 136 as driven by the motor M is not transmitted to the winding lever 146. The switch SW1 of FIG. 1 has two fixed contacts designated NO and NC in the same sense as those of SW5 with the contact NO grounded and with the other contact NC electrically connected by way of a lead to a signal terminal P1 of the connector 135, while its movable contact is connected to the camera control circuit which will be described later. The second switch SW2 has two contacts one of which is grounded and the other of which is electrically connected by way of a lead to a signal terminal P2 of the connector 135.

Figure 6:
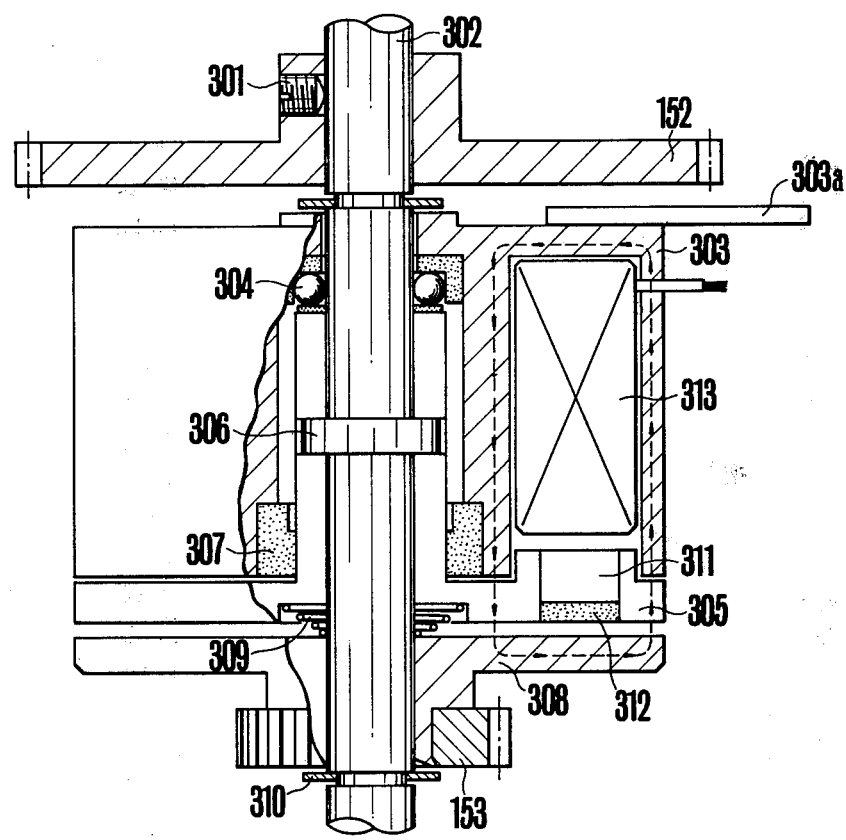
FIG. 6 is an example of the electromagnetic clutch usable in the present invention as incorporated in a motion transmitting gear train of the motor drive unit of FIG. 2.

The motor drive unit 2 includes a motor M and a motion transmission which comprises a bevel gear 148 affixed to the output shaft of the motor M, a bevel wheel 149 meshing with the bevel gear 148, a spur wheel 150 rotatable along with the bevel wheel 149 about a common axis through a slip means 151 of known construction, a driving gear 152, a driven gear 153 operatively connected to the driving gear 152 through an electromagnetically activated clutch MC of which the details will be described inconnection with FIG. 6, and a gear train including gears 154 and 155. The gear 155 is affixed to a shaft 156 of the coupler 157. 158 is a rod arranged to push upward the plunger knob 147 when the motor drive unit 2 is attached to the camera 1. 159 is a connector having four projections P1' to P4' as signal receptive terminals arranged on the unit housing to be brought into electrical connection with the respective signal producing terminals P1 to P4 when the unit 2 is attached to the camera 1, and connected to a motor drive control circuit 160. 34, SW1' and SW2' indicate similar parts to those shown in FIG. 1.

Figure 3:
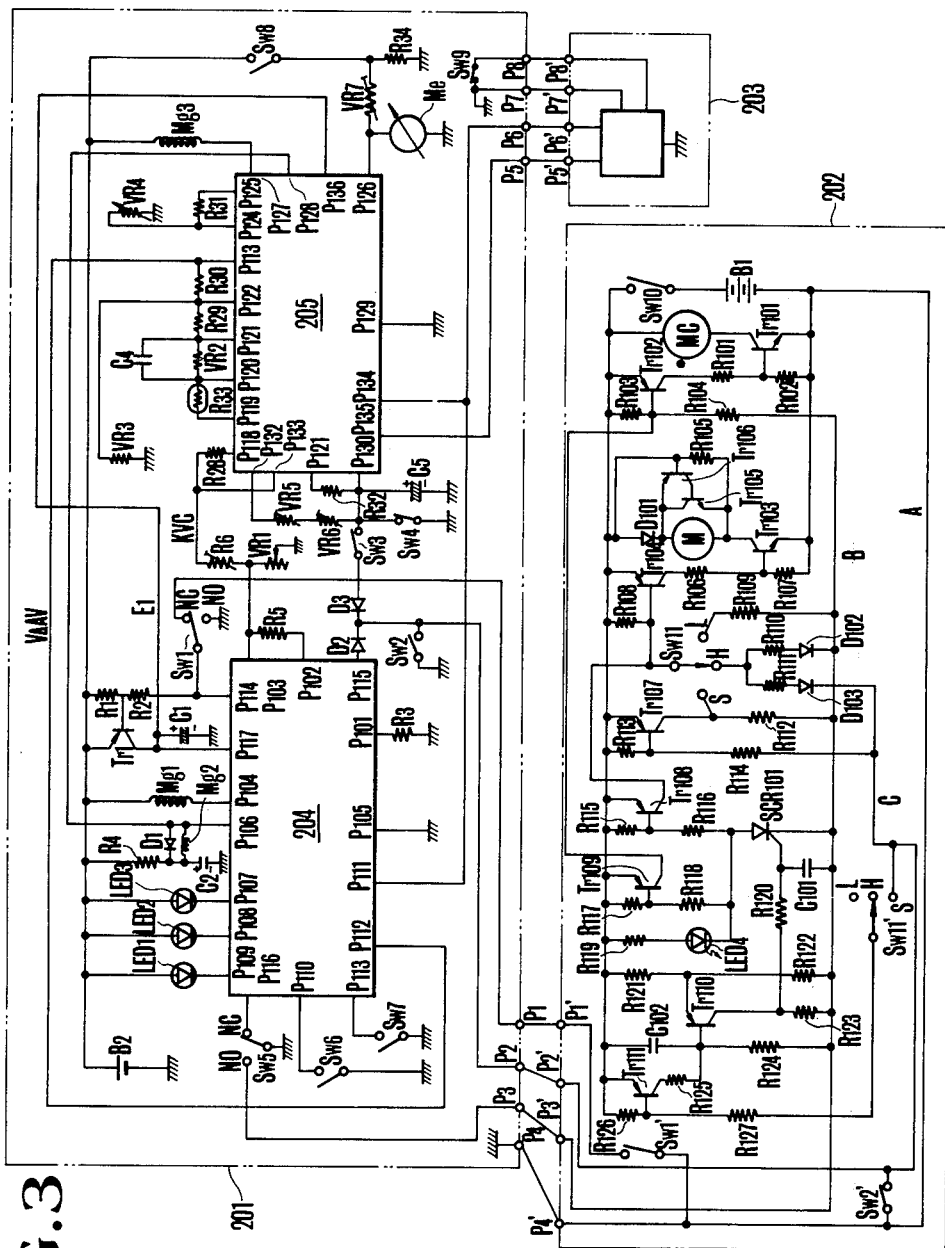
FIG. 3 is a schematic electrical circuit diagram, partly in block form, of one embodiment of the coordinating and control system according to the present invention usuable with the camera and motor drive unit of FIG. 2.

FIG. 3 shows the electrical circuitry of the motor driven camera with three circuit sections enclosed in dashed line blocks 201, 202 and 203 provided in the camera body, motor drive unit and a flash unit respectively. Block 201 includes an electrical power source or battery B2 having a negative terminal grounded, a coordinating and automatic exposure (i.e. diaphragm) control circuit 204 of which the details will be described in connection with FIG. 4, and a light metering and exposure time controlling circuit 205.

The coordinating and control circuit 204 has seventeen signal input and output points P101 to P117. A light-emitting diode LED1 is connected between P109 and a positive bus connected to the positive terminal of the battery B2 upon selection of a manual exposure control mode to be energized on. A second light-emitting diode LED2 is connected between P108 and the positive bus uoon occurrence of a lower light value than a satisfactory operating level to be energized. The first and second light-emitting diodes LEDs 1 and 2 are positioned near or in the field of view of the finder and correspond to the LED of FIG. 1. A third light-emitting diode LED3 is connected between P107 and the positive bus upon selection of a self-timer operating mode to be lighted on and arranged on the front panel of the camera housing to be visible from the object space. The second or release actuating electromagnet Mg2 is connected between P106 and a point on connection between a capacitor C2 capable of rapid energization of the electromagnet Mg2 and a register R4 for charging the capacitor C2 from the battery B2. Connected across the solenoid of the electromagnet Mg2 is a diode D1 to prevent occurrence of noise. The first or diaphragm arresting electromagnet Mg1 is connected between P104 and the positive bus. An electrical power supply control transistor Tr1 has an emitter connected to the positive bus, a collector connected to P117, and a base connected to a point on connection between resistors R1 and R2. Connected to a point on connection between R2 and P114 is the movable contact of the first actuating switch SW1. At the left margin of block 204 there is shown P116 connected to the fixed contact NC of the film winding control switch SW5, while the other fixed contact NO is connected through the combined interconnection terminals P3-P3' to a negative bus of the motor control circuit in block 202. An auto-manual change over switch SW6 is connected between P110 and the body ground. A self-timer setting switch SW7 is connected between P113 and the body earth. At the right margin of block 204 there is shown P115 connected through a diode D2 to the second actuating switch SW2 and to the signal producing terminal P2. This diode D2 functions to prevent a current from entering into the block 204 from the motor control circuit 202. A diaphragm scanning variable resistor VR1 is connected between P103 and the body ground and operates in a manner similar to that described in Japanese Patent application No. Sho. 49-3252 (Laid-Open No. Sho. 50-98321).

The light metering and exposure time control circuit 205 has nineteen signal input and output points P118 to P136. At the left margin, there is shown P130 connected to a switch SW3 which is closed when a bulb exposure is to be made, and therefrom to the cathode of the diode D2 through a diode D3. Connected between P132 and the body earth are a first variable resistor VR5 for adjustment of the correction factor of higher shutter speeds, a second variable resistor VR6 cooperative with a (not shown) shutter dial to set a desired shutter speed therein, and a timing capacitor C5 connected in series to each other. A point of connection between the resistor VR6 and capacitor C5 is connected to P130 and to a count start switch SW4 which is arranged to be opened when the front shutter curtain 9 starts to run down. A third variable resistor VR3 for setting a combination of exposure factors such as shutter speed and film speed is connected between P122 and earth. A fourth variable resistor VR4 for setting a full open aperture correction factor is connected between P124 and earth. The rear shutter curtain actuating electromagnet Mg3 is connected between P127 and the positive bus. A meter Me is connected between P126 and earth to display an exposure value, i.e., a proper diaphragm value. This meter Me also serves to display whether the actual voltage of the battery is above a satisfactory operating level which is adjustable by a variable resistor VR7 with a load resistor R34, when a checking switch SW8 is closed.

The flash exposure control circuit in the flash unit 203 produces two output signals one of which is applied through a P6'-P6 connection to both of the signal input points P11 and P134 of blocks 204 and 205 respectively to effect automatic selection of the flash mode, and another output signal which is applied through a P5'-P5 connection to P135 so that the diaphragm aperture is adjusted to a specific value suited for flash photography. An X-contact SW9 corresponds to the switch 125 of FIG. 2 and electrically connected to the circuit 203 through a pair of interconnection terminal couplings P7-P7' and P8-P8'.

The motor control circuit 202, as shown in FIG. 1, includes a motor drive or first switching circuit 29, a motor braking circuit 30, a clutch control or second switching circuit 31, a delay circuit 32 with an actuating circuit for the first and second switching circuits, and a selected mode responsive winding operation control circuit 33, each of which will be described in detail below.

The first switching circuit 29 includes a transistor Tr103 connected in an input stage of the motor M with its emitter connected to the negative terminal of an electrical power source or battery B1, and a transistor 104 for controlling the base current of the transistor Tr103 along with series connected resistors R106 and R107, with its base connected to a motor speed selecting switch SW11 and to a resistor R108.

The motor braking circuit 30 includes a transistor Tr105 connected across the coil of the motor M upon non-conduction of the power supply control transistor Tr103 to be rendered conducting, thereby the coil of the motor M is short-circuited, a transistor Tr106 having a collector connected to the base of the transistor Tr105, having a base connected through a main switch SW10 to the positive terminal of the battery B1 and through a resistor R105 to the emitter of the transistor Tr105, and having an emitter connected to the collector of the transistor Tr105, and a diode D101 forwardly connected in the power supply line to the motor M.

The second switching circuit 31 includes a transistor Tr101 with its collector connected to the solenoid of an electromagnet for the clutch MC at one end thereof, the opposite end of which is connected to the positive bus, with its emitter connected to the negative bus and with its base connected through a resistor R101 to the collector of a transistor Tr102 for controlling the base current of the transistor Tr101. The base transistor Tr102 is connected through a resistor R104 by way of a lead B to the interconnection terminal P3' and therefrom through P3 to the fixed contact NO of the switch SW5.

The switch SW11 is assembled with a similar switch SW11' each of which has three switched positions S (SINGLE FRAME mode), H (NORMAL mode with the high frame frequency) and L (NORMAL mode with the lower frame frequency). In "S" position, a transistor Tr107 is acted on, so that the motor M is maintained de-energized until the release button 16 (or 34) is freed from the force exerted to depress it. The transistor Tr107 has an emitter connected to the positive bus, a collector connected through the switch SW11 to the base of the transistor Tr104, and a base connected both to the switch SW2' through the resistor R114 and to the switch SW2 through interconnection terminals P2'-and-P2 connection.

In "H" position, the base of the transistor Tr104 is connected to an OR circuit which includes two series circuits one of which contains a resistor R110 and a diode D102 and the other of which contains a resistor R11 and a diode D103. The cathode of the diode D102 is connected by way of the lead B to the "NO" contact of the switch SW5, while the cathode of the diode D103 is connected by way of a lead C both to the switch SW2' and to the switch Sw2 through the P2'-and-P2 connection, so that when either of the setting of the switch SW5 to "NO" position and the closure of the switch SW2 (or SW2') occurs, the motor M starts to be energized. In "L" position, the base of the transistor Tr104 is connected through a resistor R109 and by way of the lead B to the switch SW5, but the switches SW2 and SW2' have no contribution to the actuation of the motor M. The transistor Tr107, diodes D102 and D103 and resistors R109 to R114 constitute the winding mode selection circuit 33.

The delay circuit 32 includes an RC timing circuit of a capacitor C102 and a resistor R124. Connected across the capacitor C102 is a transistor Tr111 having an emitter connected to the positive pole of the capacitor C102, having a collector connected through a resistor R125 to the negative pole of the capacitor C102 and having a base connected to a point on connection between resistors R126 and R127, the latter being connected to the pole of the switch SW11' so that, with SW11' set in "S" position, when the once actuated button 16 (or 34) is released to open the switch SW2 (or SW2'), the RC timing circuit starts to operate. At the termination of duration of a time interval dependent upon the time constant of the timing circuit, a transistor Tr110 is rendered conducting to actuate a thyristor SCR101 for conduction, thereby the light-emitting diode LED4 is energized and the power supplies to the motor M and the electromagnet MC are cut off, as transistors Tr108 and Tr109 are acted on by the conducting SCR101. R121 and R122 are resistors connected in series to each other between the positive bus and the lead B with a conjunction point thereof being connected to the emitter of the transistor Tr110. The collector of the transistor Tr110 is connected both to the lead B through a resistor R123 and to a gating control input terminal of the thyristor SCR101 through a resistor R120. C101 is a capacitor connected between the gating control input terminal and the cathode of the thyristor SCR101. R115 and R116 are resistors connected in series to each other between the positive bus and the anode of SCR101 with a conjunction point thereof being connected to the base of the transistor Tr108 of which the collector is connected to the base of the transistor Tr104 in the first switching circuit 29. R117 and R118 are resistors connected in series to each other between the positive bus and the anode of SCR101 with a conjunction point thereof being connected to the base of the transistor Tr109 of which the collector is connected to the base of the transistor Tr102 in the second switching circuit 31.

Figure 4:
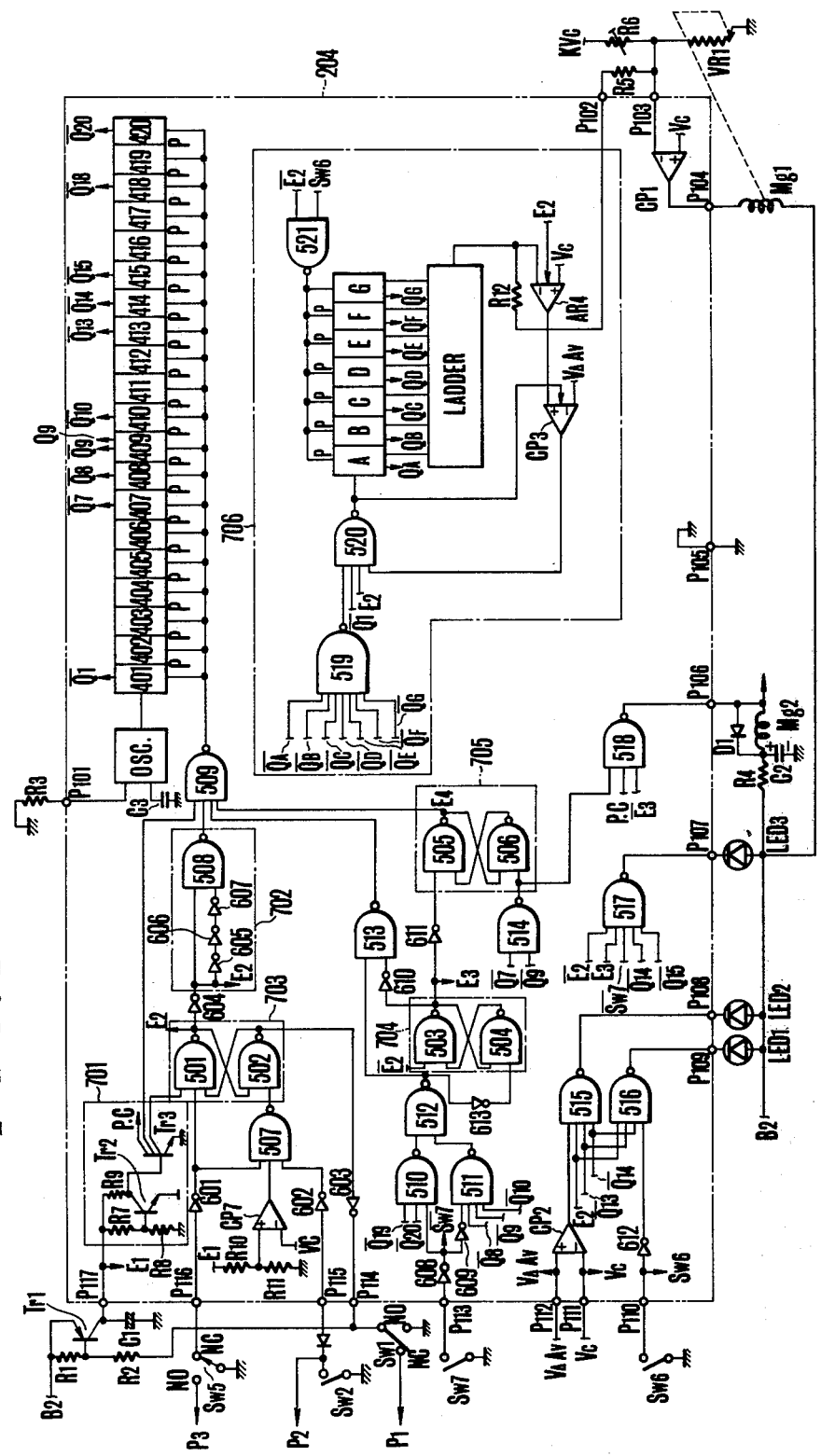
FIG. 4 shows the details of the time sequential control and automatic exposure control block 204 of FIG. 3.

In FIG. 4, the details of block 204 of FIG. 3 is shown wherein a CR oscillator OSC produces a clock pulse train at a frequency dependent upon the design parameters of a resistor R3 and a capacitor C3. This pulse train is applied to a binary counter having twenty output stages 401 to 420 with respective preset input terminals P. When the Ps take a signal of binary level "1", the individual output stages each produce outputs of binary levels Qn="1" and $\overline{Q}n$="0". The CR oscillator OSC and the binary counter 401–420 constitute a digital timer circuit. A block 706 includes a binary counter having seven output stages A to G with respective preset input terminals P responsive to an input signal of binary "1" level for causing each individual stage to produce signals of binary Qn="1" level and $\overline{Q}n$="0" level. 501 to 521 are NAND gates arranged as shown in FIG. 4. 601 to 613 are inverters arranged as shown in the figure. Dot-and-dash line blocks 701, 702, 703–705 and 706 are a power up clear circuit, a one-shot circuit, flip-flop circuits, and an AD-DA converter respectively.

The operation of the motor driven camera of FIGS. 2 to 4 will next be explained in connection with the timing chart of FIG. 5. The camera and motor drive unit are assumed to be set in the film wound up positions, and the motor drive unit is further assumed to be set in NORMAL mode with the lower frame frequency. At first, either the release button 16 of the camera or the release button 34 of the unit is depressed to a first stroke, thereby the switch SW1 is turned to "NO" position (in the case of the release button 34 depressed, the switch SW1' is turned on) at a time, a, shown in FIG. 5, and the transistor Tr1 is turned on to start supply of an electrical energy E1 through P117 to the circuit 204. At the same time, the RC digital timer starts to operate.

Upon advent of a signal E1 on the power up clear circuit 701, its output changes to "0" for a very short time so that the various circuit portions are set to their respective initial states in sequence as follows: As NAND 509 produces a signal of "1", the binary counter 401–420 is preset. The flip-flop circuit 703 is also set to the initial state with production of E2="1". Next, by $\overline{E2}$="1" signal from the inverter 604 and by the output of the binary counter 401–420, the flip-flop circuit 704 is set to the initial state with production of E3=1. Further, the flip-flop circuit 705 is set to the initial state with production of E4=1 by a signal E3="1", then the binary counter A–G constituting part of the AD–DA converter 706 is preset by a signal $\overline{E2}$="0", and an operational amplifier AR4 in the circuit 706 is operated by the signal E2="1" so that its output is dropped to a zero potential GND to prevent the diaphragm arresting electromagnet Mg1 from being actuated so long as what has occurred is no further than the closure of the switch SW1 or SW1'.

If the operating mode is manual, the switch SW6 is closed causing the inverter 612 to produce an output of "1" level which is applied to NAND 516. As E2="1", upon simultaneous occurrence of $\overline{Q}13$="1" and $\overline{Q}14$="1", this NAND 516 produces an output of "0" level so that the display diode LED1 is lighted on intermittently. If the operating mode is automatic (shutter preselection automatic diaphragm control), the switch SW6 is open with the display diode LED1 remaining lighted off. If the light value as sensed by SPD of FIG. 1 falls below the dynamic range of exposure control, that is, the output $V_{\Delta AV}$ of SPD is less than a reference voltage Vc, a comparator CP2 produces an output of "1" level which is applied to NAND 515. As E2="1", upon simultaneous occurrence of $\overline{Q}13$="1" and $\overline{Q}14$="1", this NAND 515 produces an output of "0" so that the second display diode LED2 is lighted on intermittently. Each time when one pulse is entered from the oscillator OSC, the light-emitting diode LED2 is lighted on in a predetermined period dependent upon said pulse, informing the operator looking through the view finder of the fact that the preselected shutter speed leads to the derivation of a corresponding proper diaphragm aperture value which is not available in the given lens aperture mechanism. Upon observation of the luminous state of the display diode LED2, therefore, the operator will turn the shutter dial to select an alternative shutter speed value so that the diode LED2 is turned off.

Figure 5:
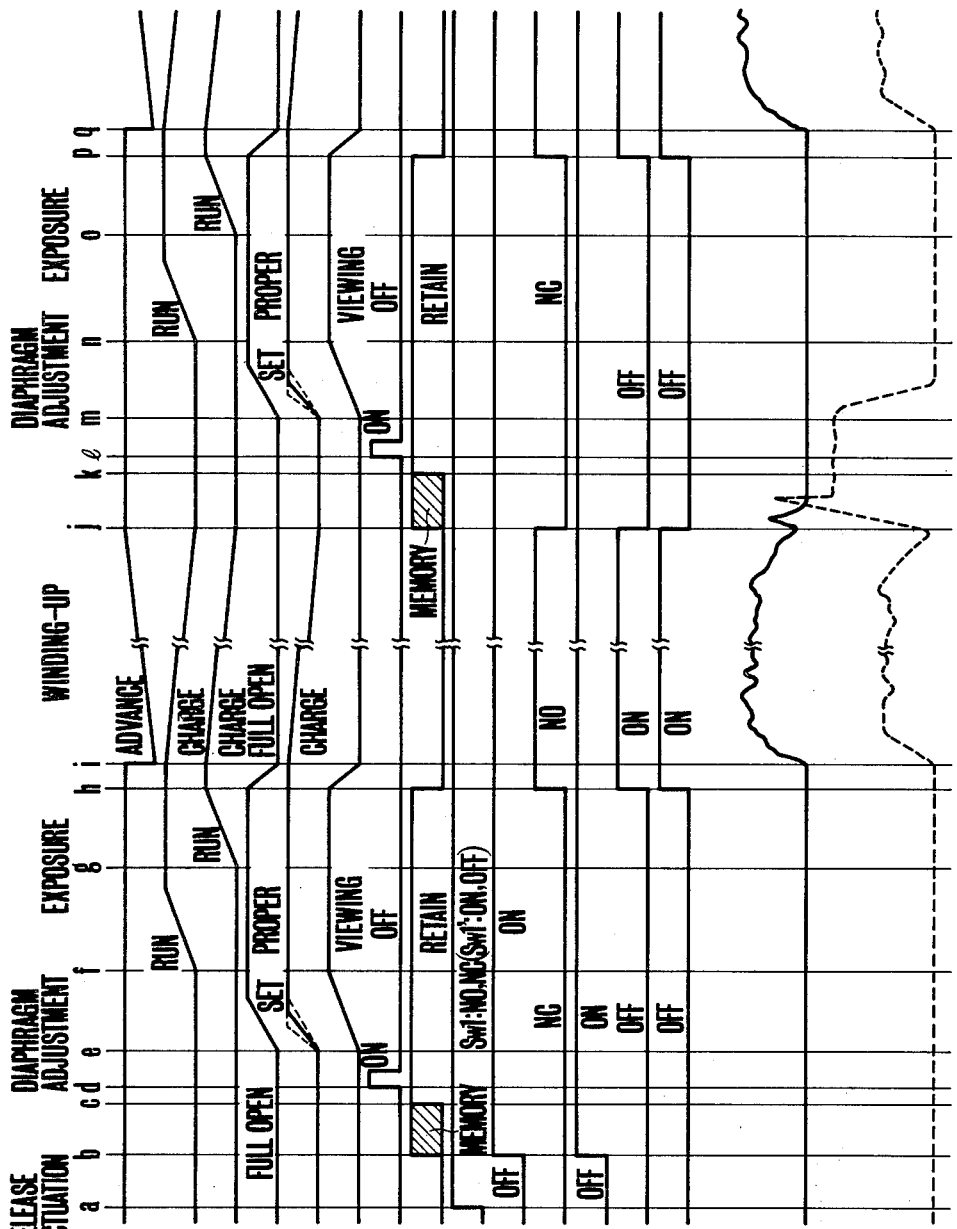
FIG. 5 is a timing chart showing a time sequence of the events occurring in the various portions of the system of FIG. 1.

Upon further depression of the release button 16 or 34 from the first stroke to the second stroke, the second actuating switch SW2 (or SW2') is turned on at a time, b, in FIG. 5 causing the inverter 602 to produce an output of "1" level. As the switch SW5 was set in "NC" position where the inverter 601 produces "1" output, and the actual voltage of the battery B2 was above the satisfactory operating level with the resulting output of a comparator CP7 being of "1", NAND 507 produces a "0" output by which the flip-flop circuit 703 is inverted to produce E2="0". Upon advent of E2="0" on NANDs 514 and 515, the first and second display diodes LED1 and LED2 are rendered inoperative. The invention of E2 from "1" to "0" also causes the inverter 603 to produce a "0" output by which a base current is extracted from the transistor Tr1 so that the switch SW2 or SW2' opened in time does not affect conduction of the transistor Tr1 (this corresponds to the self-retaining circuits 24 and 25 of FIG. 1), further causes the inverter 604 to change its output from "0" to "1" with the start of production of a "0" output from the NAND gate 508 which lasts in a time interval determined as a delay time by a string of the inverters 605 to 607 so that the binary counter 401–420 is instantaneously reset and then starts to count the number of clock pulses entered, and furthermore causes the operational amplifier AR4 to actuate the automatic diaphragm control electromagnet Mg1 for energization.

As the operating mode is automatic with the switch SW6 opened, the inversion of $\overline{E2}$ from "0" to "1" causes the NAND gate 521 to change its output from "1" to "0" with the start of the counting operation of the binary counter A–G at the time, b, in FIG. 5. The digital output of the binary counter A–G after being converted to an analogue output by a ladder circuit LADDER is applied to the operational amplifier AR4 during a time interval terminating at a time, c, in FIG. 5, reaching a level at which the output of the operational amplifier AR4 as sensed by the comparator CP3 coincides with the $V_{\Delta AV}$ dependent upon the computed exposure value, i.e. a proper diaphragm aperture value. Thus, the AD-DA converter 706 storing the proper diaphragm aperture value as shown on line (8) in FIG. 5. The time lag between the moments when the switch SW2 (or SW2') has been closed and when the comparator CP3 is inverted to terminate the duration of counting operation of the binary counter A–G is about 10 milliseconds or less. In order to prevent the counter 706 from being affected by noise due to the counting operation, the comparator CP3 is arranged to be controlled in operation by the clock pulse output of the NAND gate 520. If the operating mode was manual, the output of the NAND gate 521 remained unchanged from "1" so that the binary counter A–G did not start to operate at the time, b.

After the elapse of a time (slightly longer than 10 milliseconds) from the time point, b, the binary counter 401–420 assumes a condition where $\overline{Q}8$, $\overline{Q}9$ and $\overline{Q}10$ simultaneously become "1" and, in the case of any other mode than the self-timer mode with the switch SW7 opened, actuates the NAND gate 511 for change of its output from "1" to "0" which in turn causes the output E3 of the flip-flop circuit 704 to change from "1" to "0" at a point, d, in time in FIG. 5. As shown on line 7, the release actuating electromagnet Mg2 starts to be energized along with the shutter control electromagnet Mg3 (FIGS. 1 to 3) by the output of the NAND gate 518. This energization continues until $\overline{Q}7$ and $\overline{Q}9$ simultaneously become "1" as detected by the NAND gate 514. By the "0" output of the NAND gate 514, the flip-flop circuit 705 is inverted to change its output E4 from "1" to "0". This leads to the preset of the binary counter 401–420.

Upon actuation of the electromagnet Mg2, the automatic diaphragm control mechanism starts to operate in a manner described in connection with FIG. 1. As the diaphragm scanning variable resistor VR1 produces a time variable electrical signal, when the magnitude of this signal as sensed by a comparator CP1 has reached a level dependent upon the output of the operational amplifier AR4, the diaphragm arresting electromagnet Mg1 is de-energized to effect automatic formation of the proper diaphragm aperture in the lens aperture mechanism 4 as shown on line (5). The actuation of the electromagnet Mg2 also causes the driving of the diaphragm closing down member and the upward movement of the reflex mirror 5 as shown on lines 4 and 6 respectively.

At a point, f, in time after the completion of mirror up and automatic diaphragm control, the latching lever (corresponding to that 14 in FIG. 1) is disengaged from the master gear 107 (see FIG. 2). The front shutter curtain 9 starts to run down and the count start switch SW4 is opened to start charging of the capacitor C5 (see FIG. 3). When the front curtain 9 nears the terminal end of movement, the braking lever 124 catches the pin 107b of the front curtain master gear 107 and then exerts a reversing force on the master gear 107. As the braking lever 124 is turned clockwise, the X-contact 125 is operated to "ON" state.

During the time interval corresponding to the preselected shutter speed set in the variable resistors RV6 and RV5 (FIG. 3), the voltage on the timing capacitor C5 is varied, reaching a trigger level for the switching circuit in block 205 at a point, g, in time in FIG. 5, at which the electromagnet Mg3 is de-energized causing counter-clockwise movement of the rear curtain latching lever 121 (corresponding to that 15 in FIG. 1) under the action of the spring 123 which results in disengagement of the pawl 120 from the recess of the collar 119 affixed to the pinion shaft 112. As shown on line 3, the shutter rear curtain 10 starts to run down at the point, g, in time. When the rear curtain 10 nears the terminal end of movement, the braking lever 126 catches the pin 10b and then exerts a reversing force on the rear curtain master gear 108.

As the braking lever 126 is turned clockwise to strike the actuating lever 127 at its free end, the control lever 129 is turned counter-clockwise to be disengaged at its pawl 129a from the winding control cam disc 130. Such counter-clockwise movement of the control lever 129 also causes the switch SW5 to be switched from "NC" to "NO" position at a point, h, in time on line 11 in FIG. 5, as the contact lever 133 is pivoted about the stationary pin 132a through the open slot 113a-and-pin 129c connection.

Referring again to FIG. 4, when the switch SW5 has changed its switched portion from "NC" to "NO", the inverter 601 changes its output from "1" to "0" by which the various circuit portions are reset as follows: At first, the flip-flop circuit 703 is inverted with change of its output E2 from "0" to "1", Then the inverter 603 changes its output from "0" to "1" so that the transistor Tr1 is rendered non-conducting. The inversion of $\overline{E2}$ from "1" to "0" causes the flip-flop circuit 704 to be inverted with change of its output E3 from "0" to "1". Then the flip-flop circuit 705 is inverted by E3="1" to change its output from "0" to "1". Finally, the digital timer 401–402 and the storing circuit 706 are set to start and reset respectively. If the operating mode was manual, the display diode LED1 is again rendered effective. The out-of-range warning display diode LED2 also is rendered effective.

In FIG. 3, when the switch SW5 is changed from "NC" to "NO" position, the potential of the lead B is lower, so that, with the switch element assembly SW11 and SW11' set in "L" position, the transistor Tr104 of the first switching circuit 29 is rendered conducting and then the transistor Tr103 is rendered conducting to start energization of the motor M, while the transistors Tr102 and Tr101 of the second switching circuit 31 are rendered conducting by the common lower potential of the lead B to obtain the clutch action in the electromagnetically activated clutch MC. As a result, in automatic response to the setting of the switch SW5 from "NC" to "NO" position, the motor M is driven for rotation and motion of the motor M is transmitted to the winding shaft 136 of the camera 1 through a path which can be traced from the output shaft of the motor M through the bevel gear 148, bevel wheel 149, slip means 151, spur gears 150 and 152, clutch MC, gear train 153 to 155, winding shaft 156 of the unit and adapter 157 to the coupler 137 connected to the winding shaft 136. By the inertia of the motor M and the clutch MC, the start of winding operation at a time point, i, is delayed from the time point, h.

The driving torque exerted on the winding shaft 136 tends to drive both of the film winding mechanism and shutter cocking mechanism. In the film winding mechanism, when the winding shaft is rotated, the take-up spool 144 and the sprocket 143 are driven for rotation to advance the film through the length of one frame. In the shutter cocking mechanism, the gear 115 affixed to the winding shaft 136 is rotated and this rotation is transmitted through the gear train 116, 117 and 118 and through the triangular section 118a-and-pin 107c connection to the front curtain master gear 107 and therefrom through the pin 107a-and-pin 108a connection to the rear curtain master gear 108. As the gears 107 and 108 are rotated, the respective pinions 111 and 112 are driven to wind up respective curtains 9 and 10 against the forces of the springs 12 and 13 in the drums 113 and 114. A schematic example of variation of the torque exerted on the winding shaft 136 by the inertia of the film winding and shutter cocking mechanisms is shown on line 14 in a time space between points i and j in FIG. 5.

When the rewinding of the shutter curtains 9 and 10 has been completed, the front and rear curtain latching levers are brought into engagement with the master gear 107 and the collar 119 respectively. In the latter connection, it should be explained that, as the winding shaft 136 is rotated, the cam disc 138a is acted on the spring 121a through a (not shown) intermediary, permitting the latching lever 121 to engage at its pawl 120 with the recess of the collar 119, while the armature 122 is brought into contact with the electromagnet Mg3. Thereafter, as the drive gear 115 is designed to have three circularly elongated bottom lands spaced from each other by angular distances of 120°, when the shutter is reset, one of these lands comes to alignment with the driven gear 116, thereby the gear 116 is driven by a spring 164 for reverse rotation with the result that the gears 117 and 118 are turned to positions occurring before the winding operation.

After the shutter has been reset to the cocked position, a slight further movement of the film winding mechanism results in engagement of the locking lever 129 at its pawl 129a with the recess 130a of the winding control cam disc 130, as the rear curtain braking lever 126 was retracted from the path of movement of the actuating lever 127. At the same time, the switch SW5 is switched from "NO" to "NC" position. This time is indicated at a point, j, in FIG. 5. With the switch SW5 set in "NC" position, the potential of the lead B rises to turn off the transistor Tr111 of the delay circuit 32 and the transistors Tr104 and Tr103 of the switching circuits 29 and 31 for the motor M and clutch MC. An electromotive force generated in the coil of the motor M renders the transistors Tr105 and Tr106 conducting to stop rotation of the motor M rapidly. It will be appreciated that the provision of the electromagnetically activated clutch MC as arranged to be taken out of clutch action as soon as the winding operation is completed, makes it possible to achieve a markable reduction of the shock which would be otherwise applied to the winding shaft 136 due to the inertia of the driven mechanical parts of the motor drive unit 2. This improvement is diagrammatically shown as compared with the conventional system of line 15.

So long as the once actuated release button 16 or 34 remains unchanged in position, the setting of the switch SW5 to "NC" position causes the inverter 601 to change its output from "0" to "1". At this time, because of the maintenance of switch SW2 (SW2') in "ON" state with the supply of the electrical energy E1, the output of the inverter 602 is already of "1" so that the flip-flop circuit 703 is inverted to start a second cycle of camera operation. In other words, the phase of operation of the camera at the point, j, in time is coincident with that at the point, b, in time.

It should be understood from the torque curve after the time point, j, that the unwanted driving torque introduced after the completion of the first cycle of camera operation can be removed within a time interval of about 10 milliseconds necessary to perform complete operation of the memory circuit 706.

Likewise as in the first cycle of camera operation, the computed exposure value is stored at a point, k, in time, when an automatic camera release occurs at a time point, l, then the diagram scanning result is introduced into the lens aperture mechanism at a time point, m, then the front shutter curtain runs down at a time point, n, then after the elapse of the preselected shutter time the rear shutter curtain runs down at a time point, o, then the switch SW5 is moved from "NC" to "NO" position at a time point, p, then a film winding and shutter cocking operation is performed at a time point, q, and then the completion of this operation occurs at a time point equivalent to the time point, i.

When a continuous series of frame exposures are to be made at the higher frequency, namely, in "H" mode, the operator will turn the switch element assembly SW11 and SW11' to "H" position. At first, the camera is assumed to be set in the shutter cocked position where the film winding operation is completed. When the release button 16 (or 34) is depressed, its first stroke causes the switch SW1 to be moved from "NC" to "NO" position (or the switch SW1' to be closed), and the start of light metering operation ("a" point in FIG. 5). When the release button is further depressed, this second stroke causes the switch SW2 (or SW2') to be turned on and the start of operation of the memory circuit ("b" point in FIG. 5). Now, because of the setting of the motor control circuit 202 in "H" position, the closure of the switch SW2 (or SW2') connects the interconnection terminals P2' and P4' with each other so that the potential of the lead C is dropped to extract a base current from the transistor Tr104 through the switch SW11, the resistor R111 and the diode D103, thereby the transistor Tr104 is rendered conducting. As the transistor Tr104 is turned on, the transistor Tr103 is also turned on to supply electrical power to the motor M. At this time ("b" point in FIG. 5), however, the electromagnetic clutch MC is not supplied with electrical power yet, and, therefore motion of the motor M is not transmitted to the winding shaft 156. At the termination of the memory operation ("c" point in FIG. 5), the release actuating electromagnet Mg2 is energized to release the shutter ("d" point in FIG. 5). Subsequent operation proceeds in a manner similar to that described in connection with NORMAL mode with the lower frequency. When the rear curtain runs down, the switch SW5 is set from "NC" to "NO" position ("h" point in FIG. 5) where the interconnection terminals P3' and P4' are short-circuited to drop down the potential of the lead B. This causes a base current to flow from the transistor Tr102 through the resistor R104, thereby the transistor Tr102 is turned on. When the transistor Tr102 is turned on, the transistor Tr101 is also turned on to supply electrical power to the electromagnetic clutch MC. Since the motor M has been already rotated, at the time when the electromagnetic clutch is supplied with the electrical power, motion of the motor M is transmitted through the bevel gears 148 and 149, slip means 151, gear train 150 and 152, electromagnetic clutch MC, gear train 153, 154 and 155, motor drive unit side winding shaft 156, and winding up couplers 157 and 137 to the winding shaft 136 of the camera. Likewise as in "L" mode, the film winding and shutter cocking mechanisms are operated. In the case of "H" mode, because of the previous rotation of the motor M, no delay occurs in the ramp of the motor M when a winding operation is initiated to perform so that the time interval necessary to complete the winding operation is largely minimized as compared with the corresponding time interval between "h" and "j" points in time (FIG. 5). When the winding operation has been completed, the switch SW5 is moved from "NO" to "NC" position ("j" point in FIG. 5). At this time, if the release button is maintained depressed with the switch Sw2 (or SW2') closed, the motor M continues to rotate. Upon non-conduction of the transistor TR101, the electrical power supply to the electromagnetic clutch MC is cut off to terminate the duration of winding operation. The torque exerted on the winding shaft by shock at this time is almost equal to that occurring in "L" mode. Because, the clutch action is dissolved at the same time as that at which the switch SW5 is changed over, and the driving force of the motor M is interrupted without delay, permitting further rotation of the motor M with no effect on the winding shaft. Upon setting of the switch SW5 from "NO" to "NC" position, the memorizing operation is performed while removing the unwanted driving torque of the winding shaft to zero, and then followed by a second actuation of shutter release ("1" point in FIG. 5). Subsequent operation proceeds in a manner similar to that described inconnection with regard to the "H" mode.

Next, the operation of SINGLE FRAME operation, or "S" mode will be explained. That portion of the operation which occurs between a moment when the shutter release button 16 (or 34) is depressed and a moment when the automatic formation of the proper diaphragm aperture value is followed by the initiation of an exposure ("h" point in FIG. 5) proceeds in a similar manner to that in "L" mode. At the termination of duration of the preselected shutter time, the rear curtain runs down with the switch SW5 set from "NC" to "NO" position. Now, because of "S" mode, the switches SW11 and SW11' are set in "S" position. Therefore, when the switch SW5 is switched to "NO" position, the potential of the B point drops, and the base current of the transistor Tr102 is allowed to flow through the resistor R104, terminals P3' and P3, and the contact NO of the switch SW5, thereby the transistor 102 is turned on. When the transistor Tr102 is turned on, the transistor Tr101 is also turned on to energize the electromagnetic clutch MC. Further, at the time when the switches SW5 has changed its position to "NO", the transistor Tr107 is turned on, provided that the release button 16 (or 34) is left depressed to permit a base current of the transistor Tr107 to flow through the resistor R114 and the switch SW2' (or the terminals P2' and P2 and the switch SW2). When the transistor Tr107 is turned on, the emitter and base of the transistor Tr104 is short-circuited through the switch SW11 to maintain the transistors Tr103 and Tr104 in their non-conducting states so that the motor M is not driven for rotation. Next, when the release button 16 (or 34) is freed from the force exerted to depress it, the switch SW2 (or SW2') is opened to turn off the transistor Tr107. Thereupon, the emitter and base of the transistor Tr107 are insulated from each other to turn on the transistor Tr104 and therefore to turn on the transistor Tr103 with simultaneous energization of the motor M. As the clutch action has already been obtained, the film winding mechanism is operated in a manner similar to that shown in connection with NORMAL mode ("i" point in FIG. 5). When the winding operation has been completed, the switch SW5 is set from "NO" to "NC" position ("j" point in FIG. 5) where the transistors Tr101 to Tr104 are turned off, and the motor M and the electromagnetic clutch MC are also OFF. Thus, for each actuation of the release button 16 (or 34), one cycle of camera operation is performed.

Now assuming that all the available frames have been exposed, and that the selected operating mode is to make normal operation at the higher or lower frame frequency "H" or "L", the transistor Tr111 is always in non-conducting state, so that the RC timer of the delay circuit starts to operate when the switch SW5 has changed in position to "NO" or when the winding operation starts, and the charge on the timing capacitor C102 is discharged after the switch SW5 is set to "NC" position. In the case of "S" mode, when the switch SW2 (or the switch SW2') is closed, the transistor Tr111 is turned on. Therefore, the RC timer (C102, R124) starts to operate when the switch SW5 is set to the "NO" position and when the switch SW2 or SW2' is opened. The charge on the capacitor C102 is discharged when the switch SW5 is set to "NO" position. In other words, the RC time of the delay circuit starts to operate with charging of the capacitor in any of the modes when the winding operation is initiated, and performs the discharging of the charge on the capacitor when the winding operation is completed. After the last frame exposure has been made, the film can not be advanced any more by the energized motor M and clutch MC, so that only the motor M and bevel gears 148 and 149 are rotated. At this time, the film winding mechanism and the shutter cocking mechanism do not move through a length sufficient to set the switch SW5 to "NC" position. As the switch SW5 remains unchanged from "NO" position, the capacitor C102 of the RC timer continues to be charged through the resistor R124. During the time interval longer than that necessary to complete the normal winding operation (as described in connection with FIG. 1), the voltage of the capacitor C102 reaches the trigger level for the transistor Tr110. When the transistor Tr110 is turned on, an actuating pulse is applied from the resistor R120 and capacitor C101 to the gating control input of the thyristor SCR101, thereby the thyristor SCR101 is turned on. When the thyristor SCR101 is turned on, the light emitting diode LED4 is energized, and the transistors Tr108 and Tr109 are turned on. When the transistor Tr108 is turned on, the emitter and base of the transistor Tr104 are short-circuited and the transistor Tr103 is turned off to deenergize the motor M. When the transistor Tr109 is turned on, the emitter and base of the transistor Tr102 is short-circuited thereby the transistor Tr102 is turned off, and the transistor Tr101 is also turned off to deenergize the clutch MC. Therefore, when all the length of the film has been exposed, the motor and clutch are automatically cut off from the battery B2, and the light-emitting diode LED4 is lighted on to indicate that no more frame exposure can be made. Further, when the voltage of the battery B1 for the motor M becomes below the satisfactory operating level, the winding operation can not be performed within the time interval determined by the RC timer. In this case, the operator is informed of the fact that some malfunction has occurred, as the light emitting diode LED4 is energized.

Referring to FIG. 6, there is shown a practical example of the construction of the electromagnetically activated disc clutch MC. The gear 152 of FIG. 2 is fixedly secured to a driving shaft 302 by a screw fastener 301. A field core 303 is fixedly mounted by means of an arm 303a to the unit housing, and movably carries the driving shaft 302 through a bearing 304. A rotor 305 is affixed to the driving shaft 302 by a pin 306 and rotatable relative to the field core 303. An armature 308 is rotatably mounted on the shaft 302 and biased by a spring 309 toward abutment against a stopper 310. Coaxially fixedly mounted on the armature 308 is the gear 153 of FIG. 2. In this state, the armature travel is adjusted to a very small value, for example, 0.1 m/m. The field core 303, rotor 305 and armature 308 are made of magnetic substance (for example, electromagnetic soft iron), except for a portion 311 of the rotor 305 which is made up from non-magnetic material. 312 is a friction material such as rubber capable of insuring that, when the rotor 305 attracts the armature 308, the torque is transmitted therethrough. 313 is a coil.

In the operation of the clutch of FIG. 6, when the coil 313 is not energized, the armature 308 is spaced away from the rotor 305 by the spring 309 as shown in FIG. 6, so that even when the gear 152 is rotated, the torque is not transmitted to the armature 308 though the shaft 302 and the rotor 305 are rotated.

When the coil 313 is energized, a magnetic flux is formed as shown by dashed line arrows so that the rotor 305 attracts the armature 308 against the force of the spring 309. Therefore, when the driving gear 152 is rotated, the shaft 302 and the rotor 305 are rotated along with the armature 308, thus the torque of the driving gear 152 is transmitted to the driven gear 153. As shown above, this electromagnetic clutch operates in such a manner that when energized, clutch action is obtained.

Figure 7:
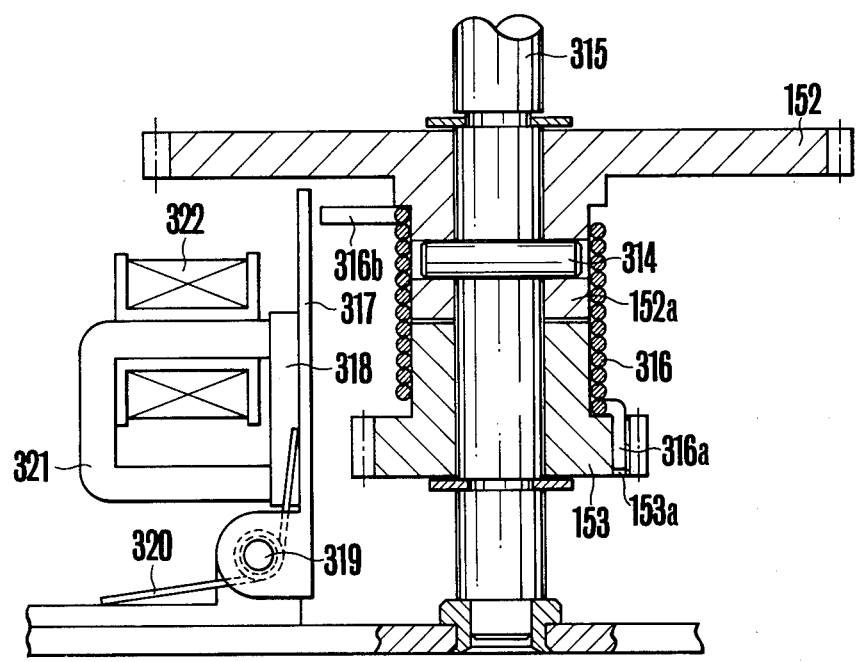
FIG. 7 is another example of the clutch, with an electromagnetic actuator therefor.

FIG. 7 shows another example of the electromagnetically activated clutch usable in the present invention. 152 and 153 are the gears described in connection with FIG. 2. The gear 152 is fixedly secured by a pin 314 to a shaft 315. The gear 153 is rotatably mounted on the shaft 315. A spring 316 has one end 316a inserted into a hole 153a of the gear 153 and an inner diameter slightly smaller than the engaging portion 152a of the gear 152. The opposite end 316b of the spring 316 extends over the external diameter of the spring into the path of movement of a stopper 317 mounted on an armature 318 pivoted about a shaft 319 and biased by a spring 320 in a clockwise direction. 322 is a coil fixedly carried on a core 321 which is mounted on the unit housing.

In operating the clutch of FIG. 7, when the coil 322 is not energized, the stopper 317 is brought into engagement with the end 316b of the spring 316 by the force of spring 320. In this state, even when the gear 152 is rotated in such a direction as to tighten the spring 316, the stopper 317 prevents the spring 316 from biting the engaging portion 152a of the gear 152 so that the torque is not transmitted from the gear 152 to the gear 153. When the coil 322 is energized, the armature 318 with the stopper 317 is attracted to the core 321, thereby the stopper 317 is disengaged from the end 316b of the spring 316 as shown in FIG. 7. In this state, when the gear 152 is rotated in such a direction as to tighten the spring 316, the torque of the gear 152 is transmitted through the spring 316 to the gear 153. As shown above, this clutch operates in such a manner that, when de-energized, the torque transmission is not established, and that when energized, clutch action is obtained.

As has been described above, according to the present invention, as shown in connection with FIG. 2, the winding shaft locking lever 129 is moved to engage in the recess 130a of the winding control cam and to simultaneously actuate the switch SW5 for setting from "NO" to "NC" position where the electromagnetic clutch is OFF with immediate interruption of torque transmission from the motor M. Therefore, almost no unwanted torque is exerted on the winding shaft after the winding operation has been completed (after "j" point in time in FIG. 5) as indicated by solid curve on line 14. In comparison with the conventional slippage clutch (the torque exerted on the winding shaft is shown by a dashed curve on line 15 in FIG. 5), the magnitude of torque exerted on the winding shaft after the completion of the winding operation is largely reduced, and the time interval necessary to remove the unwanted torque from the winding shaft is also reduced. Accordingly, there is no need to increase the strength of the camera structure to a level which would be otherwise necessary when the motor drive unit is attached to the camera. Further there is almost no need to provide a delay time necessary to remove the unwanted torque after the completion of the winding operation and before the next shutter release is initiated.

Further, in the present invention, as shown in the timing chart of FIG. 5, the above-mentioned delay time necessary to remove the unwanted torque may be overlapped on the time necessary to perform the memorizing operation (the time between "j" and "k" points in FIG. 5) to minimize the time loss in making a continuous series of frame exposures.

Further, in the present invention, in addition to the single frame operation and slow speed normal operation available in the conventional camera, there is provided a high speed normal operation which can be performed by controlling only On and OFF operation of the electromagnetic clutch, while permitting the motor to be continuously energized, and avoiding occurrence of disturbing effects on the various portions of the camera. Although the present invention has been described in connection with the system where the camera and motor drive unit are removably combined with each other, the principles of the present invention are applicable to the system where the camera and the motor drive are formed in unison.

What is claimed is:

1. A photographic system having a film winding up device and a camera, the system comprising:
   (a) said camera having a shutter means, a shutter release mechanism and a film winding up mechanism having a film wind up member, the camera including:
      (1) detecting means for detecting an exposure completion signal in response to the operation of said shutter means, the detecting means being operatively coupled to switching means which performs a switching action in response to a film winding up completion signal; and
      (2) inhibiting means for inhibiting the operation of the film winding up mechanism by the film winding up completion state of the film winding up mechanism; and
   (b) said film winding up device including:
      (1) an electric power source;
      (2) terminal means operatively coupled to said switching means;
      (3) a winding up motor which is caused to produce a driving force by electric power supply from said electric power source;
      (4) driving force transmitting means being provided with connecting means for connection to said winding up motor and also with coupling means for coupling with a film winding up mechanism provided on the camera side;
      (5) electromagnetic clutch means arranged between the winding up motor and the driving force transmitting means to transmit the driving force of the winding up motor to the driving force transmitting means;
      (6) clutch switching means connected to said electromagnetic clutch means, said power source and said terminal means to form an electric power supply network for the electromagnetic clutch means, the clutch switching means being arranged to perform a switching action to cut off power supply to the electromagnetic clutch means in response to the switching action of the switching means; and
      (7) motor control means connected to said power source and to said winding up motor to cut off power supply to the winding up motor immediately before the operation of said inhibiting means in response to the switching action of said switching means.

2. A photographic system according to claim 1, wherein said camera is provided with shutter charging means which returns said shutter means to its operative state in response to said film winding up mechanism and wherein said inhibiting means includes an engaging member arranged to be engageable with a member of said detecting means in response to the action of said shutter charging means, said film winding up mechanism being prevented from making a winding up action by engagement of said engaging member with said member of the detecting means and effecting the inhibiting action of the inhibiting means by the operation of the engaging member, and cut-off of the clutch switching means by the switching over of the switching means.

3. A photographic system according to claim 1, wherein said electromagnetic clutch means comprises:
   (a) a driving shaft which transmits the driving force of said winding up motor;
   (b) a field core made of a magnetic material and having a coil for generating a magnetic force, the field core being arranged to rotatably carry said driving shaft and being secured to said film winding up device;
   (c) a rotor made of a magnetic material and being secured to said driving shaft; and
   (d) a moving member having a contact part which comes into contact with said rotor to receive the driving force from said winding up motor and a transmitting member which transmits said driving force to said driving force transmitting means, said contact part being made of a magnetic material.

4. A photographic system having a film winding up device and a camera, the system comprising:
   (a) a camera body having at least shutter means provided with a brake mechanism, a shutter release mechanism, a film winding up mechanism and shutter charging means, the camera body including:

(1) exposure completion detecting means provided with switching means which produces an exposure completion signal in response to an exposure completing action of said shutter means; and (2) winding up inhibiting means provided with locking means which stops the winding up action of said film winding up mechanism disposed on the camera side through a member of said exposure completion detecting means immediately after the switching action of said switching means; and (b) a film winding up unit which can be coupled through coupling means with said camera body which is equipped with said various means, the film winding up unit being provided with driving force transmitting means for driving said film winding up mechanism of the camera body, the film winding up unit including:

(1) terminal means operatively coupled with said switching means;

(2) an electromagnetic clutch arranged between said driving force transmitting means and said coupling means to transmit the driving force of the driving force transmitting means to the coupling means upon receipt of an electric power supply signal; and (3) clutch switching means connected to the electromagnetic clutch and to said terminal means to produce an electric power supply signal to the electromagnetic clutch upon receipt of a changing signal of the switching means, the clutch switching means being arranged to perform a switching action to cut off power supply to said electromagnetic clutch prior to the operation of said winding up inhibiting means.

5. A photographic system having a film winding up device and a camera, the system comprising:

(a) said camera having at least shutter means, shutter charging means, a shutter release mechanism and a film winding up mechanism including a film wind up member, the camera including:

(1) exposure completion state detecting means arranged to produce an exposure completion signal in response to the operation of said shutter means, the exposure completion state detecting means being provided with switching means which performs a switching action in response to the operation of the shutter means; and (2) winding up inhibit means provided with a winding up inhibiting member interlocked with said film winding up mechanism, the winding up inhibit means thus being arranged to inhibit a film winding up action when the film winding up mechanism reaches a wind up completion state; and (b) said film winding up device being arranged to transmit a driving force of a film winding up action through the camera and coupling means, the film winding up device including:

(1) terminal means operatively connected to said switching means;

(2) an electric power source;

(3) winding up mechanism driving means which engages with said film winding up mechanism and is provided with driving force transmitting means and a wind up motor;

(4) electromagnetic clutch means arranged between the driving force transmitting means and the wind up motor to transmit the driving force of the wind up motor to the transmitting means;

(5) clutch switching means electrically connected to said power source, said electromagnetic clutch means and said terminal means to form a power supply circuit, for said electromagnetic clutch means, the clutch switching means being arranged to control power supply to the electromagnetic clutch means in response to the switching action of said switching means;

(6) wind up motor switching means electrically connected to said terminal means, said power source and said wind up motor to form a power supply circuit for the wind up motor, the winding up motor switching means being operatively connected to the terminal means and being arranged to control power supply to said wind up motor; and (7) stopping means for stopping the operation of said film winding up device, the stopping means being provided with delay circuit means which is connected to said clutch switching means and said wind up motor switching means, the stopping means thus being arranged to stop the operation of the wind up motor by producing a signal which stops power supply to said clutch switching means and to said wind up motor a preset period of time after the operation of said switching means.

6. A system according to claim 5, wherein said film winding up device includes a winding up brake circuit means electrically connected to said wind up motor, said power source and said wind up motor switching means, the winding up braking circuit means being arranged to apply a braking force to said wind up motor upon receipt of an electrical signal from said wind up motor switching means.

7. A system to claim 5, wherein said film winding up device further includes winding up action completion indicating means which is provided with a light emitting member electrically connected to said stopping means and which is arranged to emit a light to indicate the stoppage of the winding up action of said film winding up device after the operation of said stopping means.

8. A photographic system having a film winding up device and a camera, the system comprising:

(a) said camera having at least shutter charging means, shutter means, a shutter release mechanism and a film winding up mechanism and including:

(1) release means controlled to be opened and closed by a photographing operation to effect power supply control on the side of the camera;

(2) camera operating state detecting means arranged to produce an exposure completion signal in response to the operation of said shutter means, the detecting means being provided with switching means which performs a switching action in response to the operation of the shutter means; and (3) winding up action stopping means provided with locking means interlocked with said film winding up mechanism disposed on the camera side, the locking means being arranged to stop the action of the film winding up mechanism with a winding up completion state of the film winding up mechanism; and (b) said film winding up device being arranged to transmit a driving force of a film winding up action through the camera and coupling means, the film winding up device including:

(1) terminal means operatively coupled with said switching means;
(2) an electric power source;
(3) winding up driving means which is engaged with said film winding up mechanism and is provided with driving force transmitting means and a winding up motor;
(4) electromagnetic clutch means which is disposed between said winding up motor and said driving force transmitting means and is arranged to transmit a winding up driving force from said winding up motor to said film winding up mechanism disposed on the camera side;
(5) winding up motor switching means electrically connected to said terminal means, said power source and said winding up motor to form a power supply circuit for said winding up motor, the winding up motor switching means being arranged to control power supply to the winding up motor in response to the switching action of said switching means;
(6) electromagnetic clutch switching means electrically connected to said terminal means, said power source and said electromagnetic clutch means to form a power supply circuit for said electromagnetic clutch means, the clutch switching means being arranged to control supply of power to said electromagnetic clutch means in response to the switching action of said switching means; and
(7) emergization period control means for controlling the period of energization of the winding up motor, the energization period control means including a switching means electrically connected to said winding up motor switching means, said release means and said electromagnetic clutch switching means to perform the following functions through the switching means of the energization period control means:
(1) supply of power to said winding up motor while said release means is closed; or
(2) supply of power to said winding up motor switching means and said electromagnetic clutch switching means in response to the switching action of said switching means disposed on the camera side.

9. A photographic system according to claim 8, further comprising:
(a) delay circuit means electrically connected to said terminal means, said electromagnetic clutch switching means and said winding up motor switching means and arranged to stop the operation of said winding up motor by producing a signal to stop power supply to said clutch switching means and said motor switching means a preset period of time after the switching action of said switching means disposed on the camera side; and
(b) winding up motor brake means electrically connected to said winding up motor, said power source and said winding up motor switching means to supply a braking force to said winding up motor upon receipt of an electrical signal from said winding up motor switching means.

10. A photographic system according to claim 8, further comprising winding unlocking means for releasing said winding up action stopping means from the locking action thereof, in response to the action of said shutter charging means.

11. A system according to claim 8, wherein said electromagnetic clutch means includes:
(a) a driving shaft to which a gear is secured to transmit the driving force of said winding up motor;
(b) a magnetic circuit including:
(1) a field core which is made of a magnetic material and is provided with a magnetic force generating coil, said field core being arranged to rotatably carry said driving shaft;
(2) a rotor which is fixedly fitted to said driving shaft and at least a part of which is made of a magnetic material; and
(3) a moving member having a contact part which comes into contact with said rotator to receive a driving force therefrom, the moving member being made of a magnetic material and being fitted onto said driving shaft; and
(c) a transmitting member which transmits the driving force of said moving member to said driving force transmitting means.

12. A system according to claim 11, wherein there is provided a spring which is arranged to act in the direction of preventing said moving member from coming into contact with said rotor of said electromagnetic clutch means.

* * * * *